(12) United States Patent
Wakim et al.

(10) Patent No.: US 9,304,621 B1
(45) Date of Patent: Apr. 5, 2016

(54) COMMUNICATION VIA PRESSURE INPUT

(75) Inventors: Peter A. Wakim, Seattle, WA (US);
Kevin E. Keller, Sunnyvale, CA (US);
Parag K. Garg, Woodinville, WA (US);
Adam S. Kidder, Seattle, WA (US);
Ryan H. Cassidy, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 981 days.

(21) Appl. No.: 13/481,249

(22) Filed: May 25, 2012

(51) Int. Cl.
*G06F 15/16* (2006.01)
*G06F 3/041* (2006.01)

(52) U.S. Cl.
CPC .................................. *G06F 3/0414* (2013.01)

(58) Field of Classification Search
CPC ..................................................... G06F 3/0414
See application file for complete search history.

(56) References Cited

U.S. PATENT DOCUMENTS

| 6,591,198 | B1 | 7/2003 | Pratt | |
|---|---|---|---|---|
| 8,264,364 | B2 * | 9/2012 | Sprague | 340/665 |
| 2008/0211778 | A1 | 9/2008 | Ording et al. | |
| 2009/0055484 | A1 * | 2/2009 | Vuong et al. | 709/206 |
| 2009/0256817 | A1 * | 10/2009 | Perlin et al. | 345/174 |
| 2010/0057235 | A1 * | 3/2010 | Wang et al. | 700/94 |
| 2010/0079508 | A1 | 4/2010 | Hodge et al. | |
| 2010/0125816 | A1 | 5/2010 | Bezos | |
| 2010/0245246 | A1 * | 9/2010 | Rosenfeld et al. | 345/163 |
| 2010/0274847 | A1 * | 10/2010 | Anderson et al. | 709/203 |
| 2012/0064948 | A1 | 3/2012 | Lee et al. | |
| 2012/0212421 | A1 * | 8/2012 | Honji | 345/173 |
| 2012/0262582 | A1 | 10/2012 | Kimchi et al. | |
| 2013/0019187 | A1 * | 1/2013 | Hind et al. | 715/753 |

OTHER PUBLICATIONS

USPTO Non-Final Office Action dated Sep. 26, 2014, for U.S. Appl. No. 13/867,988, filed Apr. 22, 2013, 17 pages.

* cited by examiner

*Primary Examiner* — Krista Zele
*Assistant Examiner* — James Forman
(74) *Attorney, Agent, or Firm* — Novak Druce Connolly Bove + Quigg LLP

(57) ABSTRACT

A computing device can enable and/or provide communication functionality based at least in part upon a type of pressure applied to the device by a user. In some embodiments, a device can attempt to determine a mood or disposition of the user based upon the way in which the user is gripping and/or squeezing the device, and can provide the user or another person with information about that user's current mood. Similarly, a user might be able to use certain motions or pressure applications at one or more locations on a device to cause certain communications to be sent, such as to send a specific message or convey a certain mood of the user. At least a portion of the computing device can have pressure-sensitive material or capability, in order to allow for input on the sides, back, or other appropriate locations on the device.

18 Claims, 5 Drawing Sheets

COMMUNICATION VIA PRESSURE INPUT

BACKGROUND

People are increasingly relying on portable computing devices for communication, including not only telephonic communication but also texting, instant messaging, chat, and other such communication mechanisms. A potential downside to at least some of these types of communication is that a user is often unable to convey their mood or disposition along with their communication. Users often use emoticons or other methods for conveying such information, where available, such as to indicate whether the user is happy or mad when sending the message, in order to enable a recipient to properly interpret the message. Certain users are not comfortable using such approaches, and in some cases might not intend to convey their actual disposition. In other examples, such as when a user is talking on a phone, the user cannot provide such information unless the user uses verbal communication, which might not be appropriate or comfortable in all situations. Further still, a user might want to provide input or communication during use of the device, which may not be possible or at least practical based on a current activity.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to, or determining information for, an electronic device. In particular, approaches discussed herein enable an electronic device to utilize one or more sensing elements or other such components to determine an amount and/or location(s) of pressure and/or force being applied by a user of the device. Software executing on the device can analyze information from these sensing elements to attempt to determine a current mood or disposition of the user, as may be based at least in part upon user profile information or other such data. For example, many users tend to squeeze a device when in a state of frustration, stress, or anger, and a device can determine such a mood based on the way the user is squeezing the device. Further, the software can attempt to determine whether the user is attempting to provide input through changes in pressure or applied force, as may result from intentionally, squeezing, tapping, sliding, stroking, caressing, or otherwise moving one or more of the user's fingers with respect to the device. Upon determining a mood or input of the user, the software can cause an appropriate action to be taken, such as to send a communication to another person or activate certain functionality on the device.

Many other alternatives and variations are described and suggested below in relation to at least some of the various embodiments.

Figure 1A:
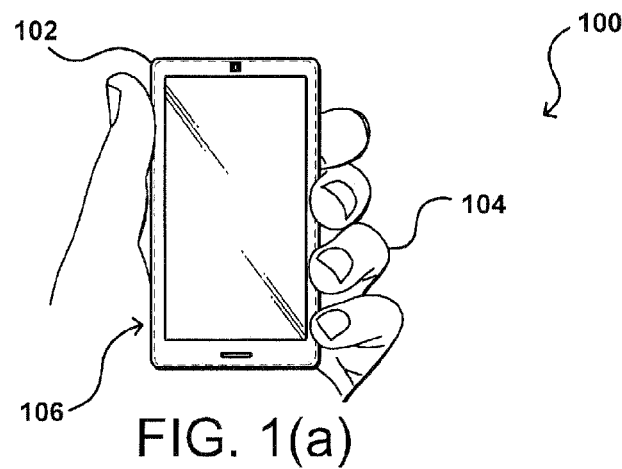
FIGS. 1(a), 1(b), and 1(c) illustrate example ways in which a user can hold, and apply pressure to, a computing device in accordance with various embodiments.
Figure 1B:
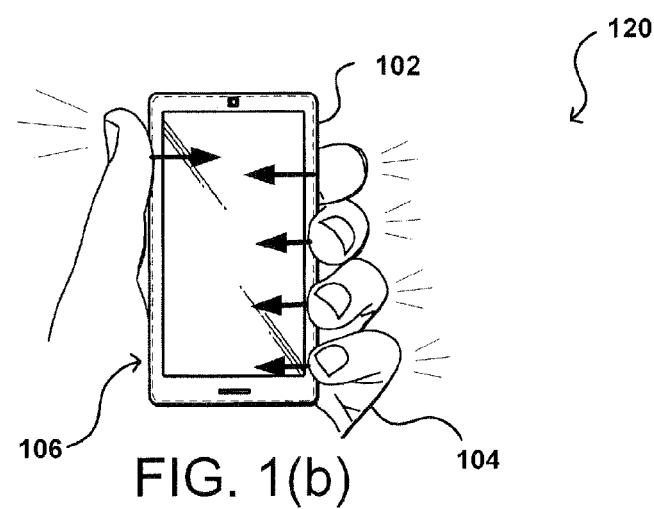
Figure 1C:
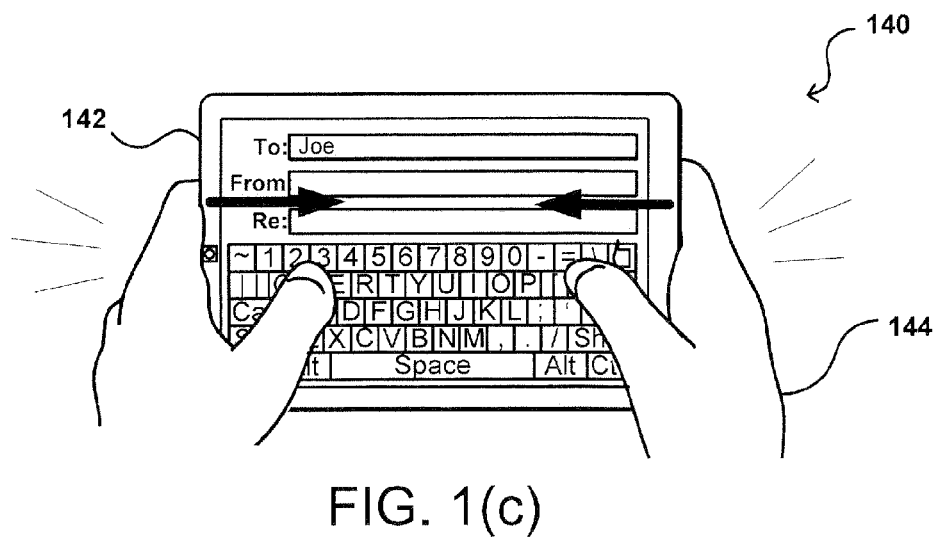

FIG. 1 illustrates an example situation 100 wherein a user is holding a portable computing device 102 in the user's hand 104. The computing device 102 can be any appropriate device, such as a smart phone, tablet computer, or personal data assistant, among other such options. For many of these types of devices, there are various ways in which a user can provide input, such as by pressing one more buttons, touching a touch screen, speaking a voice command, or typing on a keypad, among other such options. Such input mechanisms can be somewhat limiting, however, as they may not be convenient for a user during certain activities. For example, while a user is holding the device to his or her ear during a phone call, the user typically cannot easily access the touchscreen to provide input. If the device has several buttons that can be pressed, the user may not be able to locate the proper button during a call without becoming distracted. Further, a user who is angry or upset might not think to select an option to provide a specific input. Even if a user provides input, however, such an input generally will provide no information as to the current mood or state of the user unless the input corresponds directly to a mood or disposition.

In this example, the computing device 102 has a touch sensitive material 106 around an outer edge of the device. It should be understood, however, that there can be one or more touch sensitive elements at various locations on the device, such as on one or more sides, on the back of the device, on the corners, or at other such locations. The touch sensitive material can include any appropriate material or component, such as multi-touch force-sensitive resistive sensors, capacitive sensors, optical sensors, resistive sensors, pressure sensors, and the like. One specific touch sensitive component can include an interpolating force-sensitive resistor (IFSR) array touch sensor. By utilizing resistive and capacitive input and analyzing and comparing the two, it becomes possible to detect near-touches, detect light touches, and accurately characterize touches, among other such options. Furthermore, an IFSR array allows for measuring the pressure exerted by a touch on the sensor. An example IFSR array comprises two layers. A first layer incorporates columns of electrodes and a second layer comprises rows of electrodes. These layers are disposed generally perpendicular to one another, such that a grid pattern is formed. A resistive material fills gaps between the electrodes within the layers and acts as a linear resistor. When a user pushes upon the array, the resistance at various intersections between the rows and columns changes. Because of the linear responsiveness of the resistive material, it is possible for a touch controller to interpolate the location of a touch between intersections. Additionally, a magnitude of the applied force is discernible as well.

Because the first and second layers are not directly in contact, direct capacitive effects can be present as well. In some implementations projected capacitive effects may present instead of, or in addition to, direct capacitive effects. The resistive material, air, or other materials within the sensor can act as a dielectric for the capacitor. When a charge is applied to a portion of one layer, such as a particular row, capacitive coupling introduces a charge within overlapping columns. As described herein, this may be utilized to provide for touch and hovering (near-touch) detection. Furthermore, because the degree of capacitive coupling varies depending upon the composition of material, the capacitive effect may be utilized to characterize the material which is impinging the touch. For example, a human finger provides a greater capacitive coupling effect than an inanimate plastic or ceramic stylus.

Resistive and capacitive effects within a single sensor can be discernible in a time domain of a signal generated by the IFSR array. These effects may vary based upon the physical implementation of the IFSR array. In one implementation, capacitive effects result in a brief voltage spike shortly after pulsing the electrodes, whereas resistive effects result in a generally steady state voltage over a longer time span. A timeframe of these effects may be short, such as on the order of microsecond. The IFSR array may be configured to act in a capacitive mode only by placing a non-conductive layer between the first and second touch sensor layers. This implementation allows for the fabrication of an inexpensive capacitive sensor. Furthermore, this configuration may also be used in conjunction with the active stylus described below.

As with capacitive touch sensors, a pressure sensitive material or element can enable a user to provide input without need for a mechanical button, and the user can press or squeeze on any appropriate region of the device that has pressure sensitive material and is configured to accept input. While elements such as "pressure sensors" or "pressure sensitive material" are discussed herein as examples for purposes of explanation, it should be understood that any appropriate element capable of detecting and/or measuring an amount of applied force, force-per-unit-area, or other such aspect can be utilized as well within the scope of the various embodiments.

In many instances, a user can take specific actions to provide input to the device using the pressure sensitive material. For example, a user can "squeeze" the device, by applying pressure on opposing sides of a portion of the device, in order to perform an action such as to wake up the phone or close an application. Similarly, a user can slide a finger up or down on a side of the device to increase or decrease an audio volume, among other such options. A user can provide a specific application of pressure to unlock the device, or otherwise be identified to the device. Various other distinct input actions can be defined as well within the scope of the various embodiments.

It is often the case, however, that a user can unknowingly (or knowingly) provide input to the device that can be used to infer information about a state of the user. For example, consider the situation 120 illustrated in FIG. 1(*b*). In this example the user might be talking on a phone call, viewing a video, reading a text, or performing engaging in a determined activity. In this example the user is in a state of anger, upset, stress, or other such state that is causing the user to grip the device 102 harder, or squeeze the device, even though the user may be unaware of the change in pressure being applied to the device. The device in this example has pressure sensing components on opposing sides of the device, and these components are able to detect the additional pressure applied by the thumb on one side and the four fingers on the other side. Accordingly, the device can determine that the user is squeezing the phone, or otherwise applying significantly more pressure than would normally be applied when holding the device. The device can use this information to perform a number of different actions.

In some embodiments, a user squeezing the device for a short duration, such as less than two seconds, might provide a certain input to the device as discussed above. For example, if a user is on a phone call and performs a short squeeze of the device, the device might recognize an input, such as to hang up the current call, switch to another line, etc. When the squeezing lasts for a longer period of time, such as more than three seconds, the device might determine instead that the user is in a state of duress, anger, frustration, upset, etc. In at least some embodiments, the determination also can depend at least in part upon the amount of pressure applied. For example, a user might apply the most pressure when angry, a different level when upset, a different level when stressed out, and a relatively slight level when happy, among other such options or states. If the pressure sensitive components are sensitive enough, and have sufficient pressure sensing range, to determine the differences, and the differences are substantial enough, the device (or software in communication with the device) can attempt to determine the user's current mood or state of mind. Other factors might be considered as well. For example, a user might hold a device differently when angry than when upset, using a different finger spacing or location, using a different grip, etc. Also, the user might switch hands more often when in one mood than another. If voice data is available, the device can attempt to use tones or volume levels of the user's voice, or even analysis of the words the user is speaking, in order to help determine the current mood, which can be used to build a user mood model as well as to apply the model to a current situation.

In the situation of FIG. 1(*b*), the location of the user's fingers and the fact that the forefinger is applying the most pressure might match information for the user indicating that the user is angry. FIG. 1(*c*) illustrates a different example situation 140, wherein a user is typing on a device 142 with the user's thumbs, but due to the state of anger of the user the thumbs are pressing very hard, causing the user's hands 144 to apply additional pressure to the sides and back of the device, in addition to any additional pressure the user's hands are applying due to the user's grip on the device 142. If there is pressure sensitivity on the back of the device as well, the device can also detect the amount of pressure applied by the user's fingers on the back of the device. Various other ways of holding or using the device are possible, and similar approaches to determining the application of pressure on the device can be utilized as well within the scope of the various embodiments.

When the device determines a current mood or disposition of the user, such as when the user is angry, the device can cause one or more actions to be taken, which in at least some embodiments can depend upon a current context of the device. The context can be determined by a number of different factors, such as an application executing on the device, a current task being performed by the device, a time of day, a location, a profile of the current user of the device, or other such information. For example, a user might be on a call with the user's spouse. If the user is determined to be upset, the user may have configured software on the device to share that information with the spouse. As an example, the phone might generate a low volume message to be played along with the audio to let the spouse know that the user has been determined to be upset. The device also could be configured to send a message over another channel, such as to send a text message or instant message to the spouse to indicate the state of the user. In some embodiments, a ring tone or volume might change when the caller is determined to be stressed or in a state associated with a high priority. In some embodiments, the user might also specify a message to be transmitted. An advantage to sending a low volume audio notification instead of a text message, for example, is that the user will not have to take the device away from the user's ear to view the message.

In some embodiments, calls might be sent directly to voicemail when a user is determined to be stressed or upset, among other such options.

Similarly, if a user is on a call with a customer service representative (CSR) and the device determines that the user is getting angry, the device can potentially cause information to be sent to the CSR or CSR system to indicate the changing mood of the user. The CSR can then take action based on that information. In some embodiments, the CSR can adjust a tone or way of speaking to the user. In some embodiments the device can play a tone or encoded sound, which may not be detectable by most users but that can be detected by a device of the CSR system. Such a tone can cause the CSR system to change the way in which the call is being handled. For example, the system can change the script being used by the CSR to soften the tone, offer more help, or appear to be more compassionate. In some embodiments, detection of such a tone can cause the CSR system to automatically transfer the call to a call center manager or other such person, who might be better suited to deal with the call. If the user is on hold waiting or a CSR, detecting an increased level of frustration might cause that user to be moved up in the queue of pending calls.

In another example context, a user might be searching for an item on a Web site of an electronic marketplace using a tablet or other such computing device with pressure sensing capability on at least a portion of the device. If the user has executed a number of searches or has been navigating for a while, and the device can tell from the pressure that the user is starting to get frustrated, the device can send a notification to the marketplace system, or script executing for that site in a browser application, for example, which can cause a help screen, CSR chat window, or other such mechanism to be displayed to attempt to assist the user in locating specific content or information. In some embodiments, the navigation elements of the page might change to help the user narrow down search results, suggest related items, help auto complete searches, or provide the user with a set of options, among other such functionality. Once the user finds what the user is looking for and stops squeezing the phone, or otherwise returns to a normal amount of pressure being applied for that user, the site can go back to a normal state of operation. Various other types of action can be taken as well within the scope of the various embodiments.

As discussed, a profile can be generated for a particular user to attempt to better understand the amount of pressure, amount of motion, finger position, or other information associated with a user during specific states or moods. A general model might be used initially, where less than a threshold amount of pressure, as may be determined using a sampling of various users, can be determined to be a default or "normal" state or mood, and anything over a certain amount of pressure for a minimum duration of time, such as may also be determined using a sampling of users, can be determined to be an excessive amount of pressure, which can be associated with a state of anger, stress, or frustration. As the device monitors usage by the user, software executing on the device can adapt the pressure thresholds set for that specific user, such as where the user always applies at least a certain amount of pressure, or never applies more than a certain amount of pressure.

The device can also monitor actions taken by the user during certain states to attempt to determine the user's mood, which can then be associated with that type of applied pressure. For example, if a user types, selects, or speaks words or phrases such as "sorry," "sad," or "my fault" then the device can determine that the user is likely sad. If the user uses words or phrases such as "hate," "can't stand," or various expletives, the device can determine that the user is likely angry. Other trigger words can be used as well, such as "frustrated" for stress, "afraid" for fear, etc. In some embodiments, the device can also monitor the user's speech pattern to attempt to infer a mood. For example, if the user is talking very forcefully (e.g., loud and very deliberate) then the device might determine the user is angry, while soft volumes with sobbing or other such patterns can be indicative of a state of sorrow. Sensors such as gyroscopes or accelerometers can be used to determine how the user is holding the device, which can also potentially be indicative of mood for certain users, as an angry user might hold the device up straight and relatively close to the user, while a sad user might be more likely to hold the device at an angle and greater distance from the user. Similarly, if the device has at least one camera that is able to capture images or video of the user, the device can attempt to recognize certain facial patterns, such as frowns, furled brows, tears, or other such visual cues that can be indicative of certain moods. If the device includes biometric capabilities, such as through a biometric sensor or infrared imaging capability, the device can attempt to monitor things such as heart rate to attempt to determine information about the user's current state. Any of this and/or other such information can be used to help build a profile of the user's mood with respect to the way in which the user holds and/or applies pressure to the device. In some embodiments this information can be stored to a user account on a remote device (e.g., in "the cloud") that can be accessed by multiple devices, although the amount of pressure and finger placement by the user will likely vary for different, but the data can be aggregated or analyzed to at least provide a more accurate starting point for a user with respect to a new device.

A user also can have the ability to configure the type of action that is taken in response to detecting each such mood or state. As discussed, a user can determine a channel to use to send different types of notifications to other users, such as by sending a text message, instant message, SMS message, or email message, among others. Similarly, a user can indicate that notifications are also to be generated for the user, either in place of or in addition to notifications provided to others. For example, the user might want the device to play a tone, vibrate, generate a notification window on a display screen, flash an LED, or otherwise notify the user when the user is detected to be getting angry or upset, such that the user can know to take a breath, calm down, walk away, etc. The notification also might be configured for specific types of tasks. If the user is talking on a phone call with the device to the user's ear, the device might be configured to vibrate three times to indicate that the user is getting stressed, without notifying the other party to the call. If the user is using an earpiece, a low volume message or tone might be played. Similarly, if the user is typing an email message or text message and the device notices that the user is angry, the device might prompt the user with a message when the user attempts to send the message. For example, the device might generate a prompt such as "You appear to be upset—are you sure you want to send this message now?" In some embodiments, the device might instead hold the message for a period of time, such as 5-1.0 minutes, before sending in order to provide the user with a chance to cool down, as well as an opportunity to cancel the sending of the message before it is too late. In some embodiments, the user can configure the device to not send out any messages when the user is angry, and then prompt the user whether he or she wants to send the message(s) after the user is detected to have returned to a normal state (or at least within an allowable tolerance of a normal state).

Figure 2A:
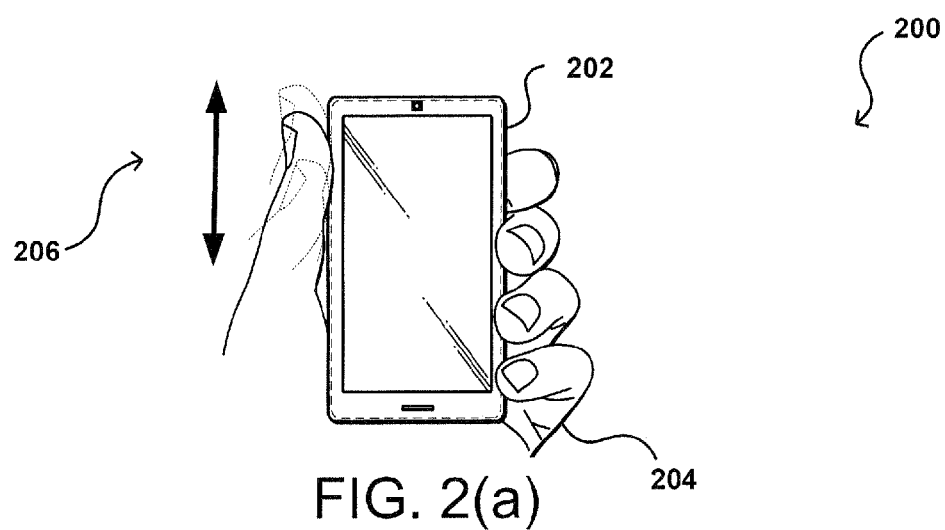
FIGS. 2(a), 2(b), and 2(c) illustrate example ways in which a user can provide specific input to a computing device in accordance with various embodiments.

The types of input, which can be conscious or subconscious actions, can also include other motions or changes as well. For example, in the example situation 200 of FIG. 2(a) a user is shown to be gently stroking the side of a computing device 202 with a thumb of the user's hand 204. The subtle stroking motion can be indicative of the user being in an affectionate mood, or other such state. The direction of the stroking, amount of movement or pressure, and even the finger used to make the motion can vary by user, if a user performs such an action at all. In some embodiments, such a motion can be matched against a default set of subconscious actions and used to infer that the user is in an affectionate state. Monitoring the user's words or actions also can be used to help with the determination as discussed above. When the user is determined to be in an affectionate state, various actions can be taken. For example, a message such as "Jerry is in a loving mood" can be sent to the person on the other end of the line if the user is on a call. If the user is texting or chatting, a heart emoticon might be automatically added to the user's text. In some embodiments, a state such as "Susie is in love" can be posted to a user's social networking page as a status update. A vibration or other haptic feedback might be generated to give some indication of the user's disposition. Various other types of notifications or actions can be generated as well within the scope of the various embodiments.

In some embodiments, determining that a user is happy or sad can cause aspects of the user interface to change as well. For example, if the user is upset maybe the user likes to see gray menus, while another user might like to see images of kittens or something else that brightens the user's spirits. Similarly, ring tones, menus, or other aspects of the device can update as well. In some embodiments, the arrangement of menus or icons can be adjusted based on a user's mood, such as to highlight applications or functions that the user is more likely to access when in that mood.

If the user is accessing a site that provides content, such as an entertainment website or an online retailer site, the types or objects displayed or recommended can also change based on the user's detected mood. For example, if the user is angry maybe a content provider suggests a comic strip page to help improve the user's mood. If the user is being affectionate, a retail site might suggest flowers, cards, or other gifts that the user might want to purchase for another. Similarly, recommendations can be updated based on the user's current mood, among other such aspects.

Similarly, a content provider might use the mood information as feedback for content displayed to the user. For example, a Web developer might determine that their interface needs updating if there are a significant number of users who become frustrated while navigating a Web site. Similarly, an advertiser or media provider can obtain demographic information about how different groups respond to ads, trailers, promotions, or other such content based on changes in different users' moods while viewing the content. Content providers can also tell how scary a movie is, or what type of reaction a user gets, while watching a version of the movie, which the producer can then take and use to edit the movie, etc.

Figure 2B:
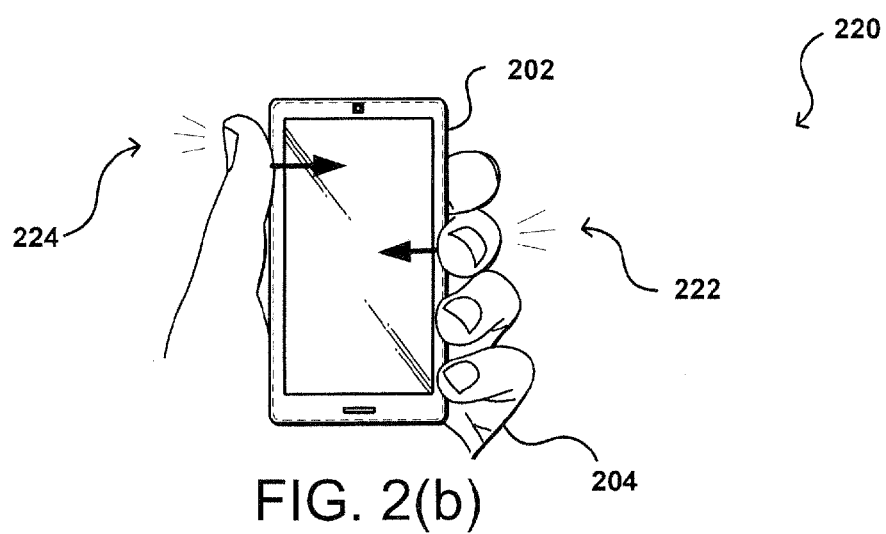
Figure 2C:
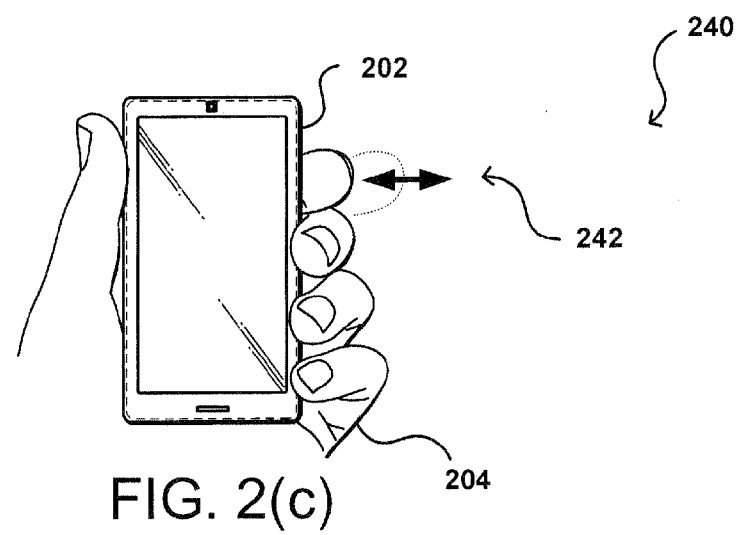

In addition to providing subconscious input through specific actions, a user also can provide various types of intentional input using the same or similar mechanisms. For example, a user can perform a specific action to initiate certain communications or other functionality on a computing device. In the example situation 220 of FIG. 2(b), the user is applying pressure using a specific combination of inputs, in this example applying pressure using the user's middle finger 222, which also causes at least some additional force to be applied using the user's thumb 224 on the other side of the device. Such an application of pressure is relatively easy for a user to apply, but is not something that would typically occur during normal operation. FIG. 2(c) illustrates another example input situation 240, wherein a user uses an index finger 242 to perform a single or multiple tap on an edge of the device. Various other motions or gestures, such as slides in various directions, combinations of taps or squeezes, or other such inputs can be utilized as well in accordance with various embodiments.

The ability to apply specific pressure inputs can enable communications to be sent that may not be able to be detected by others nearby. For example, if a user is in a business meeting that is running over, the user can potentially squeeze the device three times to cause an email message to be sent to an assistant indicating that the meeting is running over, without other people in the meeting being aware that the user is sending a message. Similarly, a student in a classroom setting might be able to stroke a side of the device to send a message such as "I love you" to a person that user is dating, without the teacher or nearby students detecting the sending of the message. A user on a call might be able to provide a specific input to cause a message to be sent to a caller on another line to indicate that the user is on a call, but will call that person back. Various other such communications can be sent discretely as well within the scope of the various embodiments.

In at least some embodiments, the device 202 can determine the relative location of each of the user's fingers based at least in part upon the location and orientation of specific concurrent applications of pressure. In some embodiments, the device might develop a pattern corresponding to ways in which the user holds the device, as well as the shape, size, and separation of portions of the user's hand or fingers, in order to better interpret the pressure data and determine which pressure points correspond to which portions of the user's hand. Accordingly, when a user applies additional or lesser pressure using at least one finger, or makes a specific motion with a particular finger, the device can determine which finger is performing the action, and can determine the appropriate input to be provided. The device might also learn over time which motions or variations correspond to natural behavior of the user, and which are intended to be interpreted as input. For example, a user might tend to tap the phone with a finger with a slight amount of pressure when the user is bored, listening to music, etc. When the user intends to provide input using a tap, the user might perform the tap with at least a minimum amount of pressure, a maximum amount of duration, a timing between taps, etc. As discussed elsewhere, at least a portion of the determination or learning can be performed remote to the device, such as through a monitoring service or information processing server.

Being able to determine that the pressure is being applied by a user's hand or fingers based on such information can also be advantageous in that the device does not recognize false input when pressure is applied while the device is in a book bag, purse, or other such location. In at least some embodiments, pressure detection might only be activated when the device is in an unlocked state, such that false input is not detected when the user is not using the device but pressure might otherwise be applied. Other embodiments can attempt to use cameras, light sensors, or other such information to attempt to determine whether pressure input should be applied, such as when the user is looking at a display screen of the device or holding the device near the user's ear during a call. Certain activities can also enable pressure input, such as the device supporting an active phone call or chat session.

In at least some embodiments, a user, developer, manufacturer, and/or other such entity can define, update, and/or customize the various motions that can be defined as device inputs, as well as the associated functionality, input, or action that is to be activated and/or provided in response to those device inputs. For example, a user might define a double tap to cause the device to delete a current message when the user is reviewing email, voicemail, texts, or other such communications. The functionality for a motion or pressure input also can vary depending upon certain context information. For example, the user might define a double tap to also cause the device to switch to another line when using a telephony application. A sliding action with a specific finger might correspond to an adjustment of volume during a phone call or video chat, and might correspond to an emoticon being included during a text session. Various other motions, pressure applications, and functionality can be utilized and/or associated in accordance with the various embodiments.

In at least some embodiments, a device can provide a user with notification that an action is about to be taken, such that the user can make an adjustment or otherwise indicate to the device that the action should not be taken. For example, if the device determines that the user is angry during a call with another person and is about to send a message to the person on the other line about the anger, the device might first vibrate, play a tone, cause a low volume audio notification to be played through a speaker or earpiece, or otherwise notify the user of the upcoming action. If the user intends to allow the action to occur, the user can continue the current behavior. For example, if the user is squeezing the device, the user can continue to squeeze the device and the message can be sent. If, on the other hand, the user does not want that message to be sent, the user can stop squeezing the device, which can indicate to the device that the user does not want to send the message and the message can be canceled. In some embodiments, the user can perform an input to cause a different action to be taken. For example, the user might double tap on the device to cause the device to delay sending the message, send the message over a different communication channel, send a different message, or perform another such action.

The actions that are taken, such as messages sent to others, can vary based upon various contextual information, such as what the user is doing, who the other(s) are, which device the user is using, etc. For example, if the user is texting with another user then a message might be sent as a separate text from the same, or a different, sender, where here the different sender might be identified as the user's device. If, on the other hand, the user is on a video chat, the message can be sent using another layer of audio or can be conveyed by adding a graphic to the video portion indicating to the other user, or both users, that the user is getting angry.

Similarly, the content of the message itself can vary depending in part upon the context or recipient, such as may be adjustable by the user. For example, if the other person is a business contact, the message might include a message such as, "This conversation is becoming emotionally charged—should we attempt a different approach?", while for a spouse or child the message might be something like "The user is becoming upset" or "Maybe try a different approach that will have a calming effect," etc. There can be a set list of messages from which the user can select, the user can generate customized message, or other such actions can be taken. The user can then assign the messages to specific people, or can designate types of users in a contact list or other such location, and the messages can be different for whether the contact is a business contact, friend, acquaintance, family member, etc.

Figure 3:
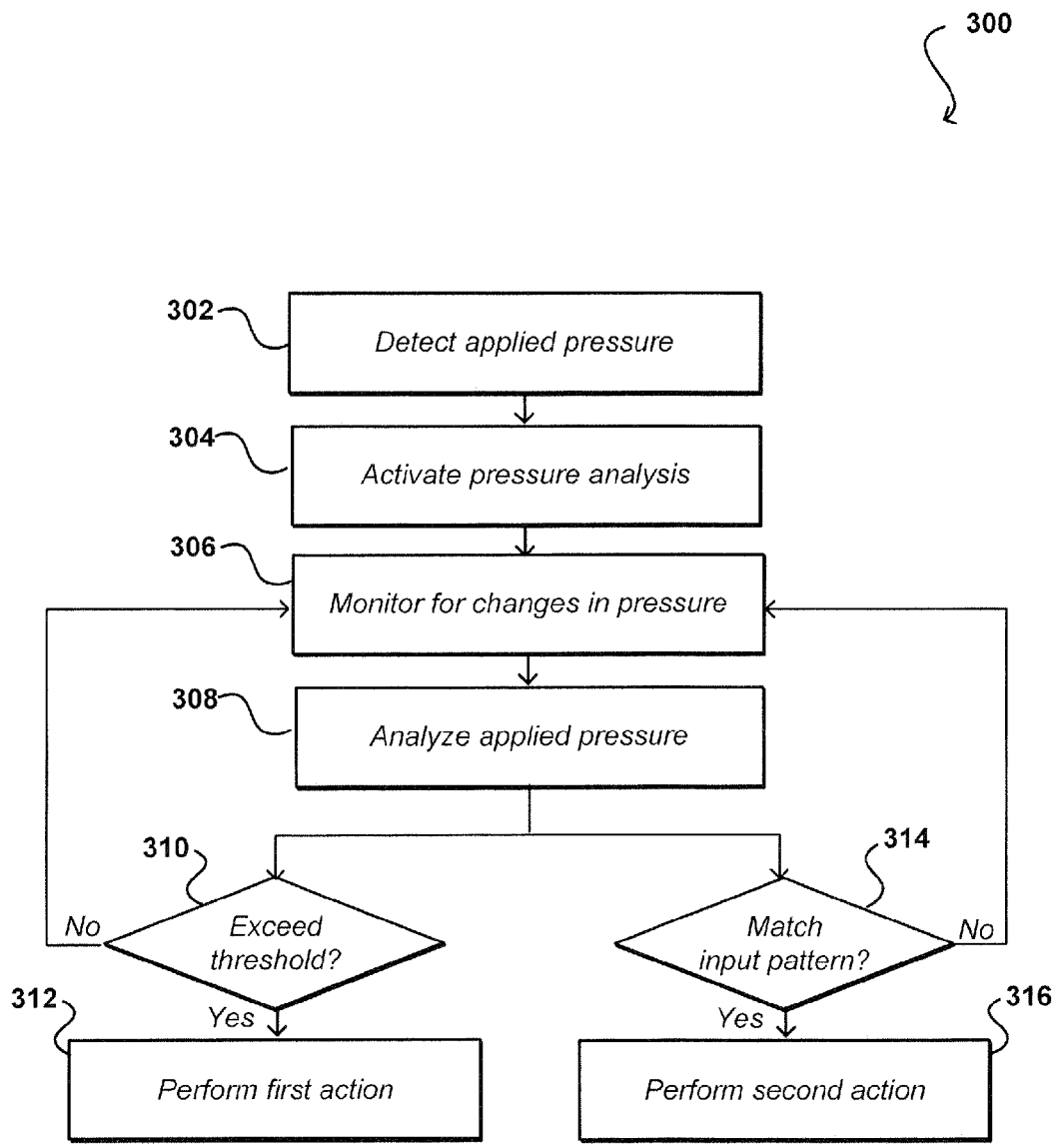
FIG. 3 illustrates an example process for determining pressure-based device input that can be utilized in accordance with various embodiments.

FIG. 3 illustrates an example process 300 for detecting pressure-based input that can be utilized in accordance with various embodiments. It should be understood, however, that there can be additional, fewer, or alternative steps performed in similar or alternative orders, or in parallel, within the scope of the various embodiments unless otherwise stated. In this example, a computing device can detect 302 pressure, gradients of pressure, or variable amounts of being applied to one or more regions of the device, as may correspond to a user picking up the device. In response to the detection, the device can activate 304 at least one pressure monitoring and analysis routine or component on the device. The device can monitor 306 for changes in pressure applied by the user to the device, and can analyze 308 the applied pressure either at all times, periodically, during certain activities, or when the applied pressure at least meets a certain criterion or pressure threshold, such as an amount of variation over a period of time, a change in the amount of applied pressure, etc. In this example there are at least two aspects of the applied pressure that can determine whether to apply input, and those determinations can be done concurrently or in any specific order. For example, the device can determine 310 whether the amount of applied pressure meets or exceeds a maximum pressure threshold, at which point the user might perform 312 a first action, such as to send an indication to another person that the user is upset. Similarly, the device can determine 314 whether the applied pressure matches a determined input pattern, such as the user stroking a side of the device, performing a double tap, applying pressure in a specific way, or other approaches discussed or suggested herein. If the pressure matches a pattern within an acceptable tolerance, amount of deviation, etc., the device can perform 316 a second action. As discussed, however, there can be additional determinations made and actions taken as well, or alternatively, within the scope of the various embodiments.

In certain embodiments, default functionality might be activated and/or provided in response to certain user actions. For example, if a user is determined to be applying an unusually high amount of pressure to the device, or a high amount of pressure for an unusual period of time, the device can be configured to prompt the user whether to call 911 or other emergency services. The device can first generate a notification to the user, such as by vibrating, flashing a message on a display screen, playing an audio notification, or providing a specific haptic feedback, among other such options. In some embodiments, the device can attempt to determine other information about the user before taking such an action. For example, the device can attempt to monitor the tone of the user's voice or pattern of speech or words spoken by the user. If available, the device can attempt to use biometrics or infrared imaging to attempt to determine a pulse rate of the user. The device can also attempt to use a camera, if available and properly positioned, to capture an image or video of the user and analyze the information to attempt to determine a state of the user. The mechanism thus might be able to differentiate between a situation where the user is in need of medical attention versus whether the user is in danger. Accordingly, the device can determine an appropriate message to be conveyed, and can determine an appropriate notification mechanism. For example, if the user is in a dangerous situation the device can provide a notification to the user through haptics, for example, that might not be perceived by another person nearby. In some embodiments, the device can also be configured to attempt to capture image information, audio, or other such information that can be sent to emergency services, along with GPS data or any other information that might be useful in assisting the user. In some embodiments this additional information might not be able to be supplied directly to emergency services, but can be stored to a designated location (e.g., a remote server or emergency notification service) for subsequent retrieval if needed. Various other approaches can be utilized as well as should be apparent in light of the description contained herein.

In some embodiments, the application of pressure using specific finger combinations, motions, pressure levels, or other such aspects also can be used as a type of language or code input. For example, each letter or number could be assigned a specific code or combination, sharing a similar approach to Morse code but where a user applies pressure, taps, or performs other such actions to provide the input. A user thus could communicate, draft message, or perform other such actions merely through manipulation of the pressure applied to one or more specific locations on a computing device.

Various applications can take advantage of such functionality as well. For example, a virtual pet game can take advantage of the pressure sensitivity to enable the user to interact with the virtual pet by stroking the phone as if the user is petting the virtual pet when happy. Similarly, an adaptive artificial intelligence component of a video game might adjust the number of type of obstacles thrown at a user during a game based at least in part upon the detected state of the user. For example, if the user is playing a puzzle game and the device determines that the user is getting frustrated, the device might adjust the difficulty level of the upcoming puzzles to attempt to bring the user back to a state of enjoyment. Similarly, if the user is playing an action or horror-based game, the device might increase the difficulty or number of foes if the user is not having a desired reaction. For example, during a boss battle, a gaming application might make the battle more difficult if the user is not detected to be challenged by the game, which often causes changes in pressure, movement of the device, etc.

As discussed, the communication channel over which notifications are sent can vary based at least in part upon contextual information as well. For example, if a user is on a phone call with another user then part of the audio band can be used to send data, while on a VOIP call the data can be transmitted over the IP connection. Depending on the type of notification to be sent, channels can be utilized that support email messaging, text message, text or video chat, SMS messaging, instant messaging, and the like. In at least some embodiments, a user can select certain channels to be used in certain situations while in other situations the channels can be determined dynamically, such as when the user is connected to a WiFi hotspot but does not have cellular service, or has cellular service but not an Internet connection, etc.

Figure 4:
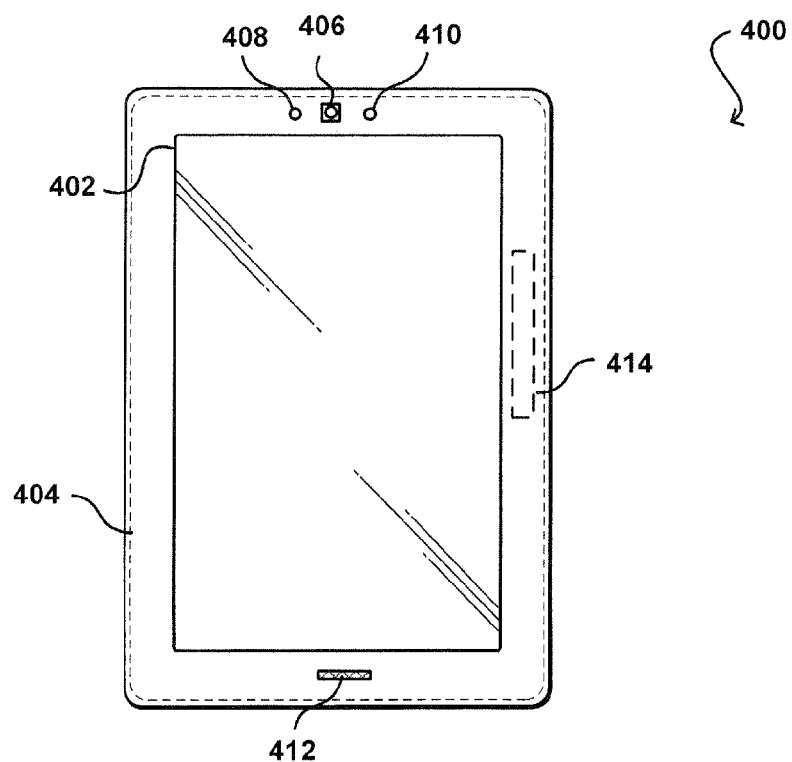
FIG. 4 illustrates an example computing device that can be utilized in accordance with various embodiments.

FIG. 4 illustrates an example electronic user device 400 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 400 has a display screen 402 on the front side, which under normal operation will display information to a user facing the display screen (e.g., on the same side of the computing device as the display screen). The computing device includes a pressure-sensitive material 404 or component around an outer edge of the device, although as discussed the material can be on one or more sides of the device, on a back of the device, or in other such locations. The device also includes at least one communication component 414 operable to enable the device to communicate, via a wired and/or wireless connection, with another device, either directly or across at least one network, such as a cellular network, the Internet, a local area network (LAN), and the like. Some devices can include multiple discrete components for communicating over various communication channels.

The computing device in this example includes at least one camera 406 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video. The device also includes a light sensor 408 and an illumination element 410, such as a white light or infrared (IR) LED for providing illumination to assist with image capture based at least in part upon current environmental conditions.

The example computing device 400 also includes at least one microphone 412 or other audio capture device capable of capturing audio data, such as words or commands spoken by a user of the device. In this example, a microphone is placed on the same side of the device as the display screen 402, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

Figure 5:
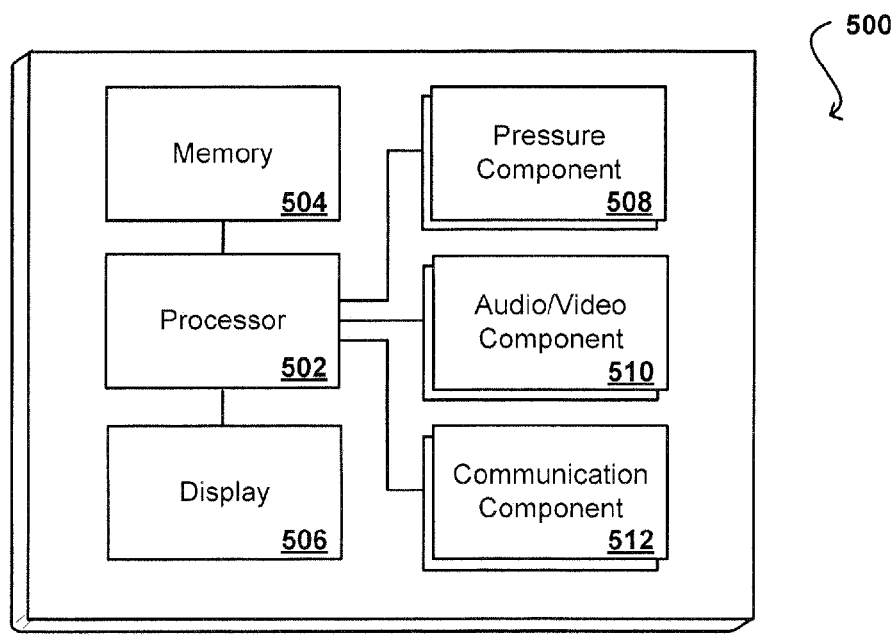
FIG. 5 illustrates an example set of components that can be utilized in a device such as that illustrated in FIG. 4.

FIG. 5 illustrates a logical arrangement of a set of general components of an example computing device 500 such as the device 400 described with respect to FIG. 4. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include one or more audio and/or video components 510 for capturing and/or presenting audio and/or video content. Such components can include at least one image capture element such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 500 includes one or more pressure sensing components or sub-systems 508, such as may include a force-sensitive resistance material over one or more regions of the device. In some embodiments a dedicated pressure processor and/or chip can be utilized that can provide input to a main processor of the device. Other pressure sensitive components can be used as well as discussed elsewhere herein, as may include optical mechanisms, capacitive mechanisms, and the like.

The computing device 500 of FIG. 5 can include one or more communication elements or networking sub-systems 512, such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 500 also can include at least one orientation or motion sensor (not shown). Such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 502, whereby the device can perform any of a number of actions described or suggested herein.

Figure 6:
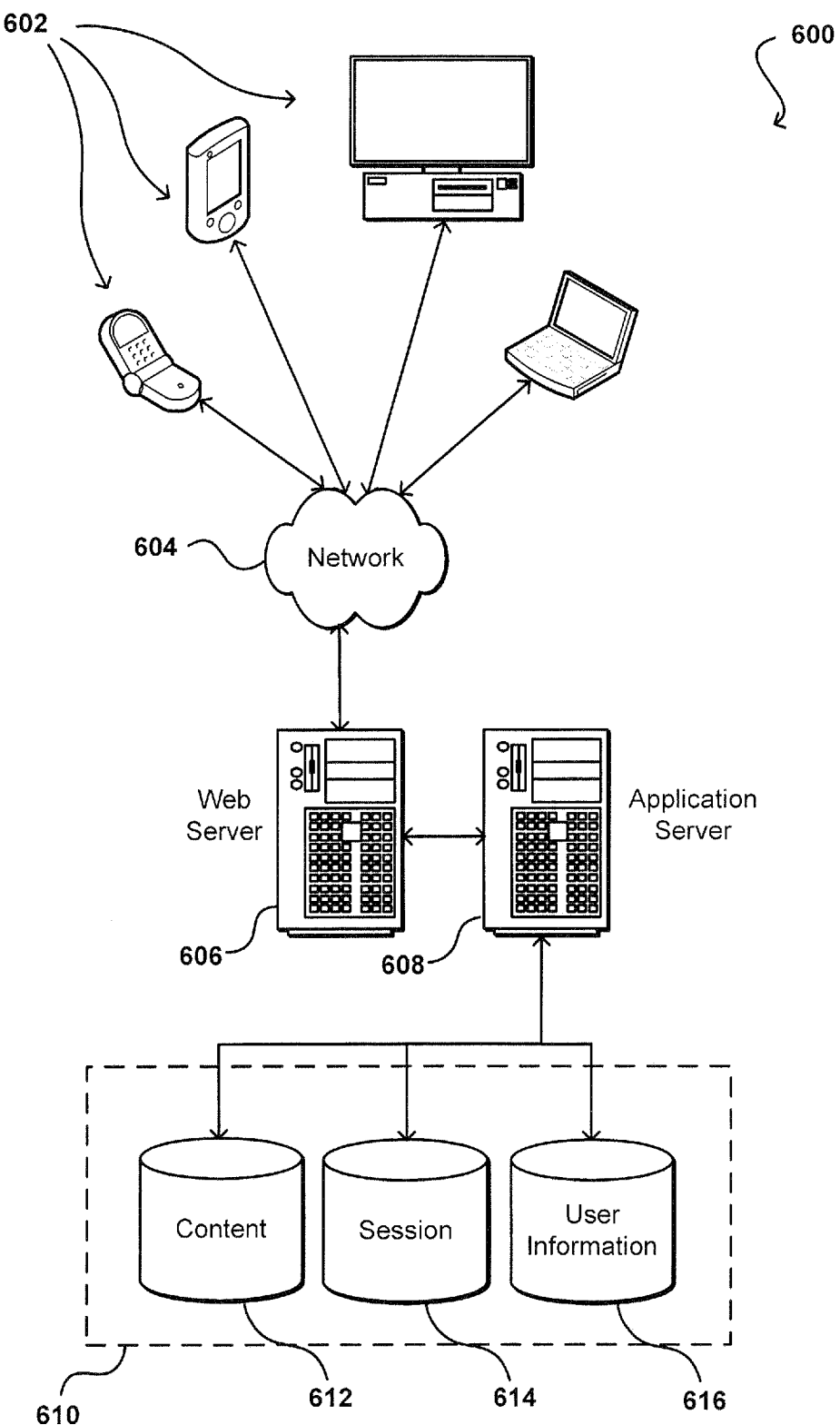
FIG. 6 illustrates an example an environment in which various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 608 can include any appropriate hardware and software for integrating with the data store 610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 606 in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content (e.g., production data) 612 and user information 616, which can be used to serve content for the production side. The data store is also shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
 detecting, using at least one sensor, a first signal indicative of first pressure being applied to a computing device;

determining, at a first time, a first mood associated with the first pressure based at least in part upon the first signal corresponding to a first reference pressure value;

deactivating one or more communication components of the computing device;

detecting, using the at least one sensor, a second signal indicative of second pressure being applied to the computing device;

determining, at a second time, a second mood associated with the second pressure based at least in part upon the second signal corresponding to a second reference pressure value; and activating the one or more communication components after a period of time from the second time.

2. The computer-implemented method of claim 1, wherein the at least one sensor includes at least one multi-touch force-sensitive resistive sensor positioned on at least one of a side, a top, a bottom, a corner, a back, or a periphery of the computing device.

3. The computer-implemented method of claim 1, further comprising:

monitoring amounts of pressure applied to the computing device by a user at different points in time;

capturing contextual information during each of the different points in time;

determining the first mood based at least in part upon the contextual information;

determining the first reference pressure value based at least in part upon a first amount of pressure being applied to the computing device at a first period of time corresponding to the first mood;

determining the second mood based at least in part upon the contextual information; and determining the second reference pressure value based at least in part upon a second amount of pressure being applied to the computing device at a second period of time corresponding to the second mood.

4. The computer-implemented method of claim 3, wherein the contextual information includes at least one of voice tone information, voice inflection information, pattern of speech information, recognized speech information, visual cue information, biometric information, text information, device orientation, an executing application, a current task, time or date information, user profile information, a blood oxygen level, a neurological activity, an amount of hand moisture, a blood pressure, or a pulse rate of the user.

5. The computer-implemented method of claim 1, further comprising:

determining a location on the computing device corresponding to the first signal, wherein the first mood is further determined based at least in part upon the location on the computing device.

6. The computer-implemented method of claim 1, further comprising:

sending a notification to a determined person before deactivating the one or more communication components, a type of the notification depending at least in part upon a current activity of a user with respect to the computing device.

7. The computer-implemented method of claim 6, wherein the notification includes information about the first mood.

8. The computer-implemented method of claim 7, wherein the first mood includes at least one of a state of anger, affection, depression, euphoria, contentment, sadness, stress, frustration, upset, or happiness.

9. The computer-implemented method of claim 1, further comprising:

providing a notification to a user before deactivating the one or more communication components.

10. The computer-implemented method of claim 9, wherein the notification includes at least one of a tone, an audio message, an image display, haptic feedback, an instant message, a text message, an email message, a short message service (SMS) message, or an illumination of an element on the computing device.

11. The computer-implemented method of claim 1, further comprising:

determining, based at least in part upon the first signal, at least one of a duration of the first pressure being applied, a finger or a thumb applying the first pressure, or a number of locations where the first pressure is concurrently being applied, wherein the first mood is further determined based reference at least in part upon at least one of the duration of the first pressure being applied, the finger or the thumb applying the first pressure, or the number of locations where the first pressure is concurrently being applied.

12. The computer-implemented method of claim 1, wherein the first mood is further determined based at least in part upon a current context of the computing device.

13. A computing device comprising:

a processor; and a memory element including instructions that, upon being executed by the processor, cause the computing device to:

detect, using at least one sensor, a first signal indicative of first pressure being applied to the computing device;

determine, at a first time, a first mood associated with the first pressure based at least in part upon the first signal corresponding to a first reference pressure value;

deactivate one or more communication components of the computing device;

detect, using the at least one sensor, a second signal indicative of second pressure being applied to the computing device;

determine, at a second time, a second mood associated with the second pressure, based at least in part upon the second signal corresponding to a second reference pressure value; and activate the one or more communication components after a period of time from the second time.

14. The computing device of claim 13, wherein the instructions upon being executed further cause the computing device to:

send a notification of the second mood to an application; and cause the application to adjust at least one interface of the application based on the second mood.

15. The computing device of claim 13, wherein the instructions, upon being executed, further cause the computing device to:

generate a user profile for a user, the user profile including a first association of the first reference pressure value to the first mood and a second association of the second reference pressure value to the second mood.

16. A non-transitory computer-readable storage medium storing instructions, the instructions, upon being executed by a processor, causing the processor to:

detect, using at least one sensor, a first signal indicative of first pressure being applied to a computing device;

determine, at a first time, a first mood associated with the first pressure based at least in part upon the first signal corresponding to a first pressure value;

deactivate one or more communication components of the computing device;

detect, using the at least one sensor, a second signal indicative of second pressure being applied to the computing device;

determine, at a second time, a second mood associated with the second pressure based at least in part upon the second signal corresponding to a second reference pressure value; and activate the one or more communication components after a period of time from the second time.

17. The non-transitory computer-readable storage medium of claim 16, wherein the instructions, upon being executed, further cause the processor to:

select a message to be sent based at least in part upon one of the first mood or the second mood.

18. The non-transitory computer-readable storage medium of claim 17, wherein the instructions, upon being executed, further cause the processor to:

prompt a user before sending the message based at least in part upon the at least one of the first mood or the second mood.

\* \* \* \* \*